May 19, 1970  A. A. ENNEPER ET AL  3,512,437

ORBITING ROTARY CUTTING APPARATUS

Filed June 22, 1967  7 Sheets-Sheet 1

INVENTORS
ARNOLD A. ENNEPER
HARVEY JAMES SPENCER
ANTHONY R. WIERZBA
BY Anderson, Luedeka, Fitch, Even, & Tabin ATTYS

INVENTORS
ARNOLD A. ENNEPER
HARVEY JAMES SPENCER
ANTHONY R. WIERZBA

BY Andersen, Luedeka, Fitch, Even & Tabin ATTYS.

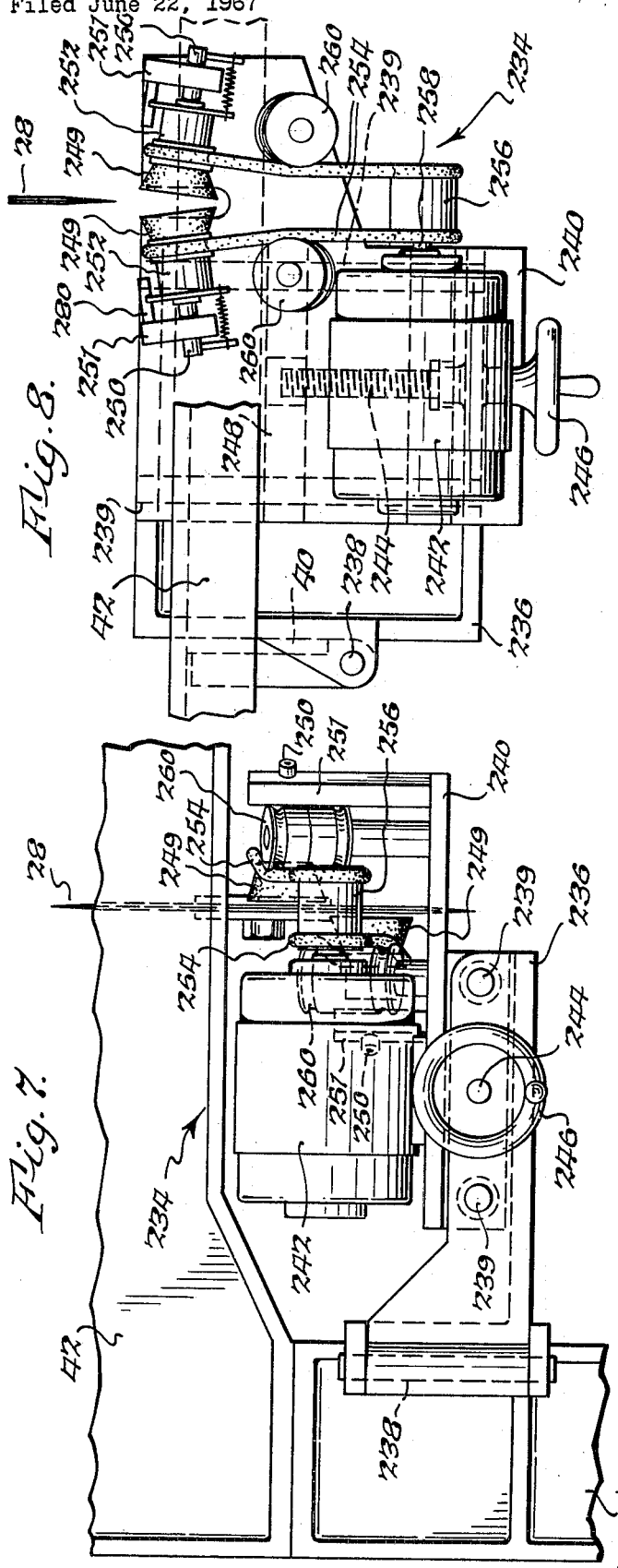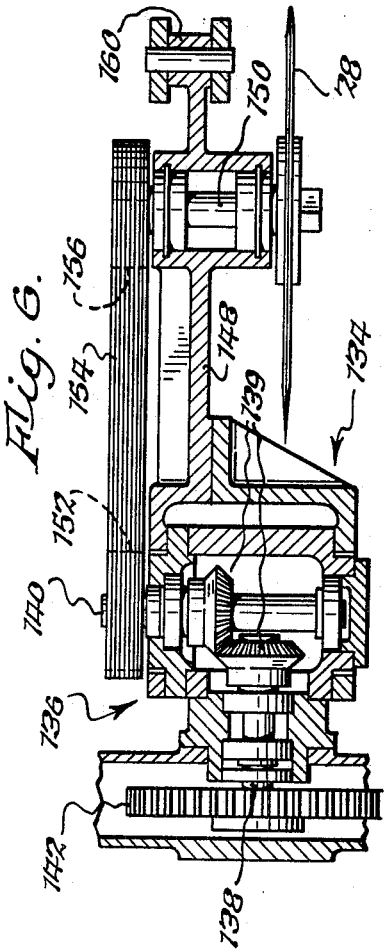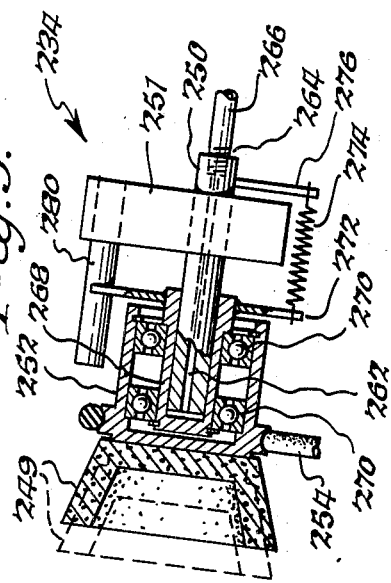

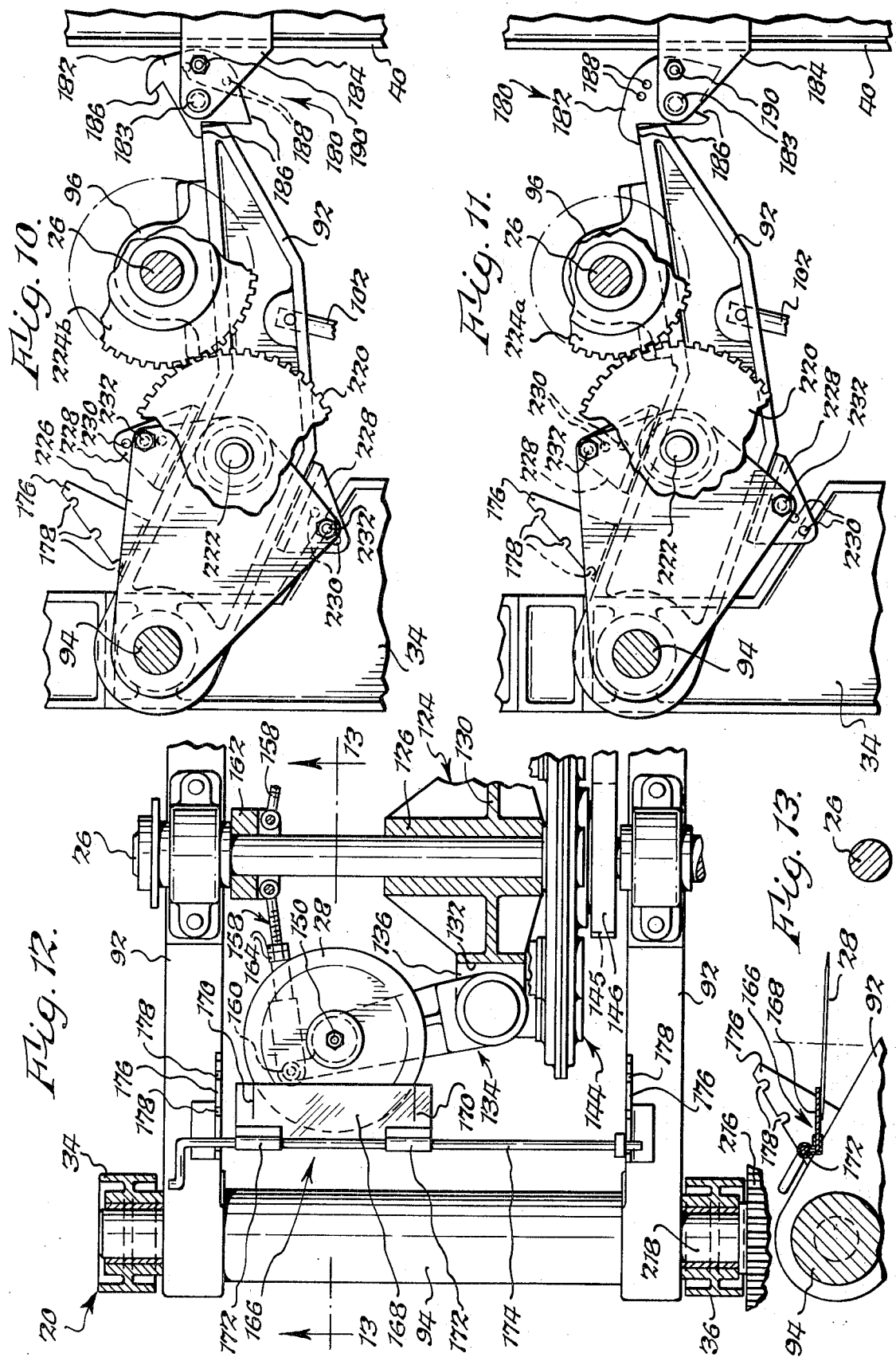

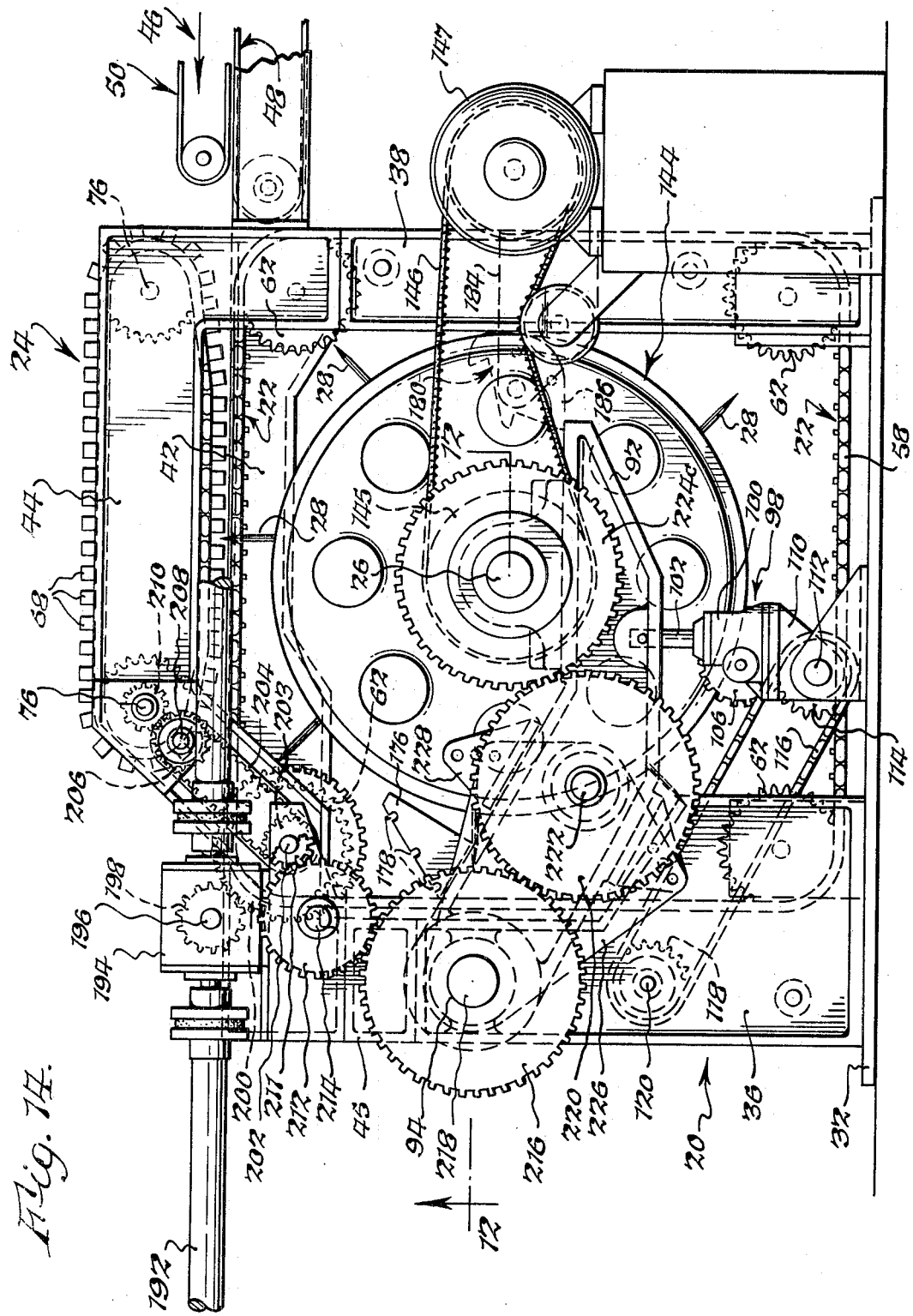

United States Patent Office 3,512,437
Patented May 19, 1970

3,512,437
ORBITING ROTARY CUTTING APPARATUS
Arnold A. Enneper, Harvey James Spencer, and Anthony R. Wierzba, Green Bay, Wis., assignors, by mesne assignments, to International Paper Company, New York, N.Y., a corporation of New York
Filed June 22, 1967, Ser. No. 648,007
Int. Cl. B26d 7/12
U.S. Cl. 83—174          11 Claims

ABSTRACT OF THE DISCLOSURE

Apparatus for cutting a continuously moving strip into segments of predetermined length including a plurality of generally planar circular cutting blades mounted in circumferentially spaced relation about a first axis positioned adjacent the path of the strip. The blades are caused to orbit about the first axis, and each blade is caused to rotate about a second axis transverse to the plane of the blade. Provision is made for selectively varying the length of the segments cut, for insuring a straight line cut, and for periodically sharpening the blades.

---

The present invention relates to cutting apparatus and, more particularly, to apparatus for dividing a continuously moving strip, web, etc. into segments of predetermined length.

In U.S. Pat. No. 3,211,147, there is disclosed a method of providing disposable diapers which includes the steps of continuously forming an elongated endless continuously moving enclosed pad, embossing the pad transversely at pre-determined intervals along its length, and severing the pad at the area of embossing to provide individual diapers. The present invention relates to an apparatus particularly suitable for, but not limited to, the severance of such a pad into segments of pre-determined length.

In the manufacture of disposable diapers, it is desirable to provide diapers of different sizes, each size varying in length from the others and adapted to accommodate infants and children within a certain size range. Thus, an apparatus for severing an enclosed pad to form such diapers is preferably capable of adjustments which permit the length of the segments cut to be varied. Also, the apparatus preferably includes means for periodically sharpening the cutting instruments, and means for insuring a relatively straight line cut so that the ends of each diaper will be essentially square. The apparatus of the present invention is believed to satisfy these criteria.

A principal object of the present invention is the provision of an improved apparatus for severing a continuously moving web, band, strip, etc.

Other objects and advantages of the invention will become apparent with reference to the following description and accompanying drawings.

In the drawings:

FIG. 5 is an enlarged fragmentary sectional elevational view taken along line 5—5 of FIG. 4;

FIG. 6 is an enlarged fragmentary sectional view taken along line 6—6 of FIG. 3;

FIG. 7 is an enlarged fragmentary elevational view looking in the direction of the arrows 7—7 of FIG. 3;

FIG. 8 is a fragmentary plan view of that portion of the apparatus shown in FIG. 7;

FIG. 9 is an enlarged fragmentary elevational view of a portion of the apparatus shown in FIGS. 7 and 8;

FIG. 10 is an enlarged fragmentary sectional elevational view taken generally along line 10—10 of FIG. 2;

FIG. 11 is a view similar to that of FIG. 10 but showing portions of the apparatus in slightly different operating positions;

FIG. 12 is an enlarged fragmentary bottom view taken generally along line 12—12 of FIG. 14;

FIG. 13 is an enlarged fragmentary sectional elevational view taken along line 13—13 of FIG. 12; and FIG. 14 is a fragmentary elevational view looking in the direction of the arrows of 14—14 of FIG. 2.

Figure 1:
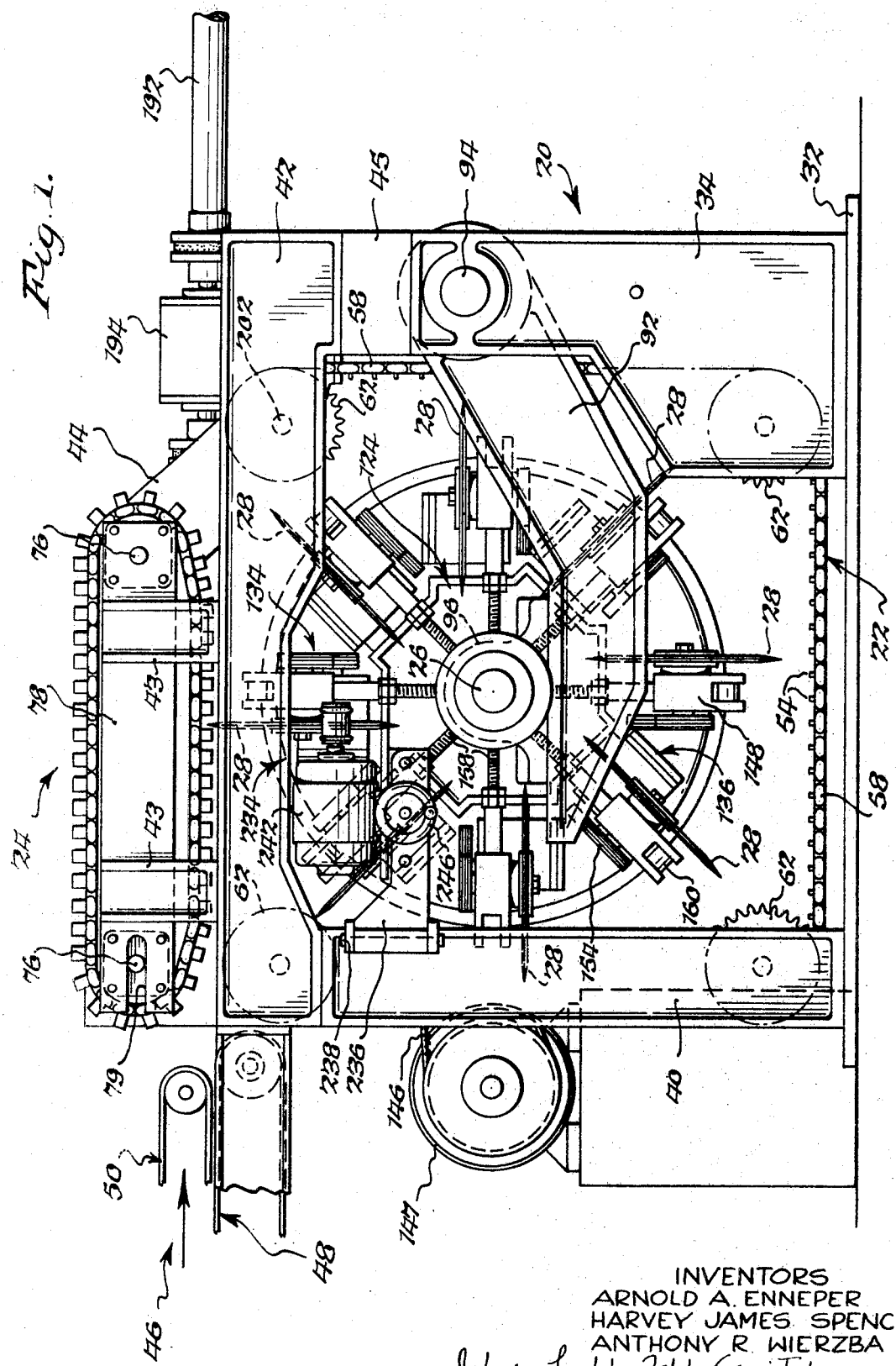
FIG. 1 is a fragmentary front elevational view of a cutting apparatus showing various of the features of the invention.

The cutting apparatus shown in the illustrated embodiment is adapted to sever an endless strip of material into predetermined lengths. While the apparatus is suitable for the severance of various materials, it is particularly adapted to the severance of an enclosed web to form disposable diapers, previously referred to, and will be hereinafter described with respect to such application. It is to be understood, however, that the apparatus is not limited to this use, which is selected only by way of illustration and convenience of description and not by way of limitation.

Very generally, the illustrated apparatus comprises a frame 20 which carries a web supporting conveyor 22 and a web holddown conveyor 24. Also mounted on the frame 20, for orbital movement about a shaft 26, are a plurality of rotating cutting disks or blades 28, which are moved in the direction of, and are arranged transversely to, the web during cutting. In order to permit adjustment of the length of the segments into which the web is cut, each cutting disk 28 is mounted so that its distance from the shaft 26 can be varied, and the shaft 26 is mounted on the frame 20 for shifting movement relative to the conveyors 22 and 24. The former adjustment also permits compensation for wear of the cutting disks 28, as will become apparent.

Figure 2:
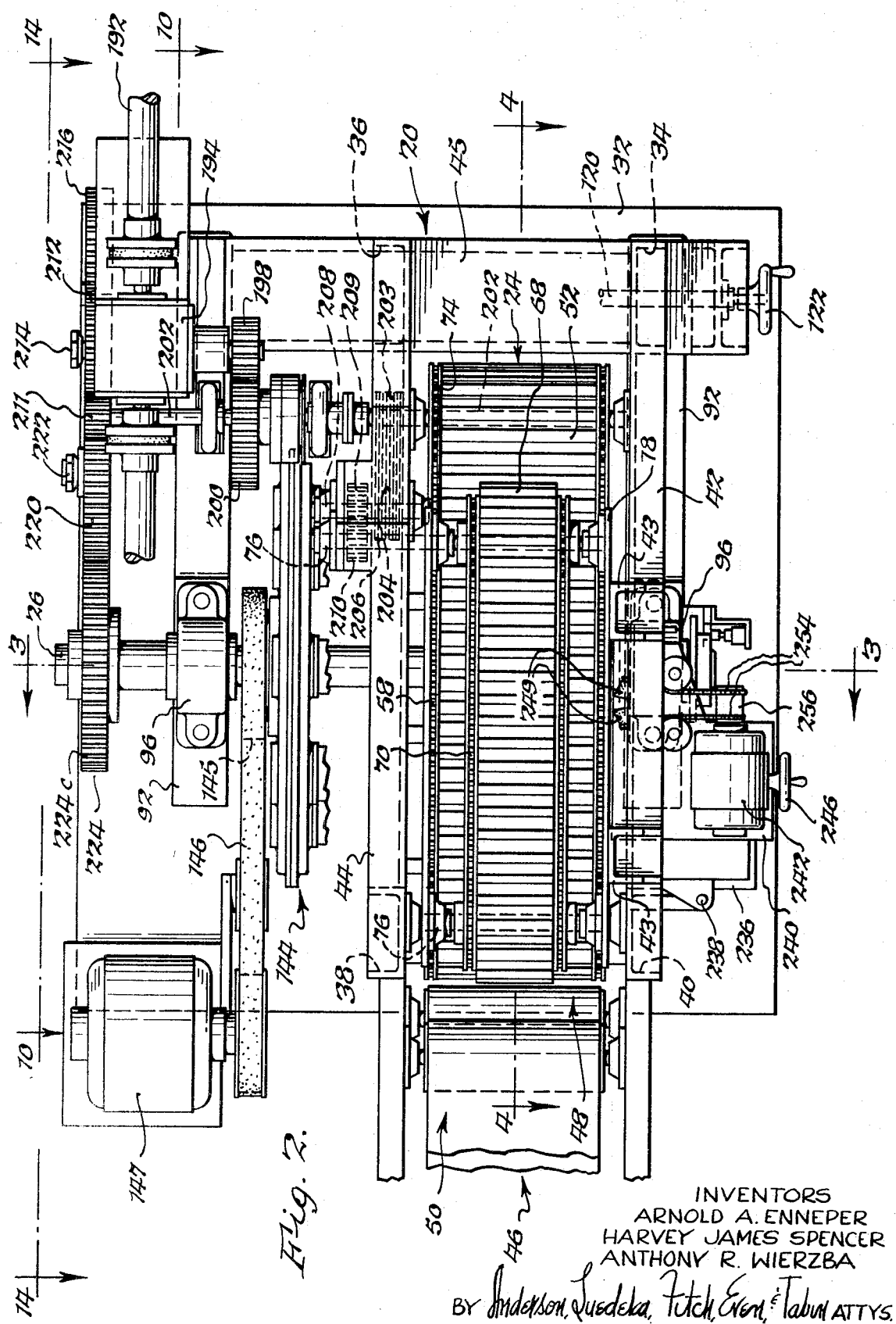
FIG. 2 is a fragmentary plan view of the apparatus of FIG. 1.

More particularly, the frame 20 comprises a generally rectangular base 32 having a pair of horizontally spaced vertical supporting posts 34 and 36 extending upwardly from adjacent one of its ends (the right end in FIG. 1), and having a pair of somewhat similar horizontally spaced vertical supporting posts 38 and 40 extending upwardly from adjacent the opposite of its ends (FIG. 2). A heavy cross beam 42 rests upon and is secured to the upper ends of the support posts 34 and 40, and a similar beam 44 rests upon and is supported by the posts 36 and 38 at a slightly higher elevation. A third cross beam 45 extends between the support posts 34 and 36.

The web is delivered to the cutting apparatus by an infeed conveyor 46 (FIGS. 1, 2 and 14) which is illustrated as comprising an endless lower conveyor belt 48 and an endless upper or holddown conveyor belt 50. The conveyors 48 and 50 are driven in timed relation to the conveyors 22 and 24, preferably by a suitable mechanical coupling arrangement (not shown). Other forms of conveyors may, of course be substituted if desired.

Figure 3:
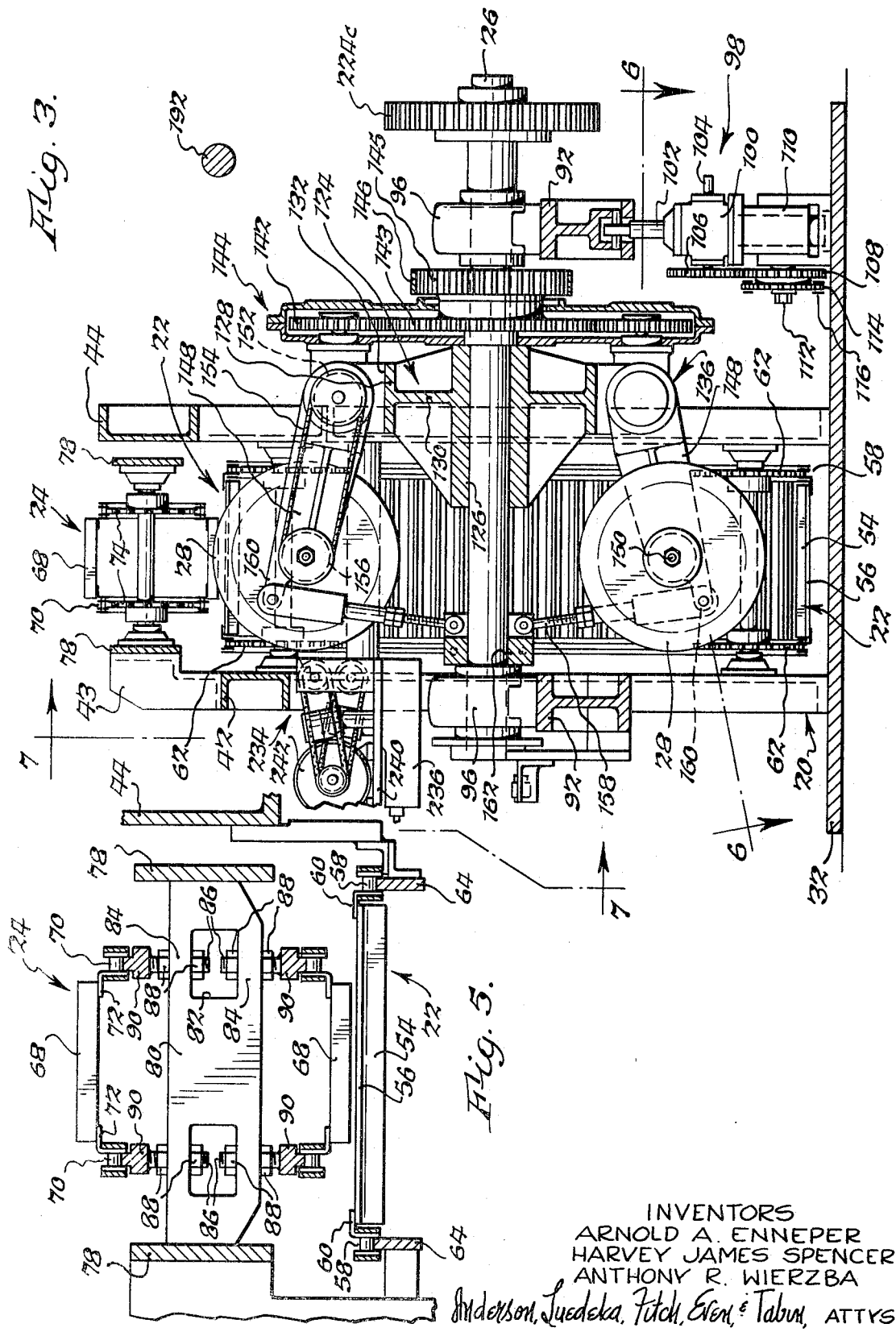
FIG. 3 is a sectional elevational view taken along the line 3—3 of FIG. 2.
Figure 4:
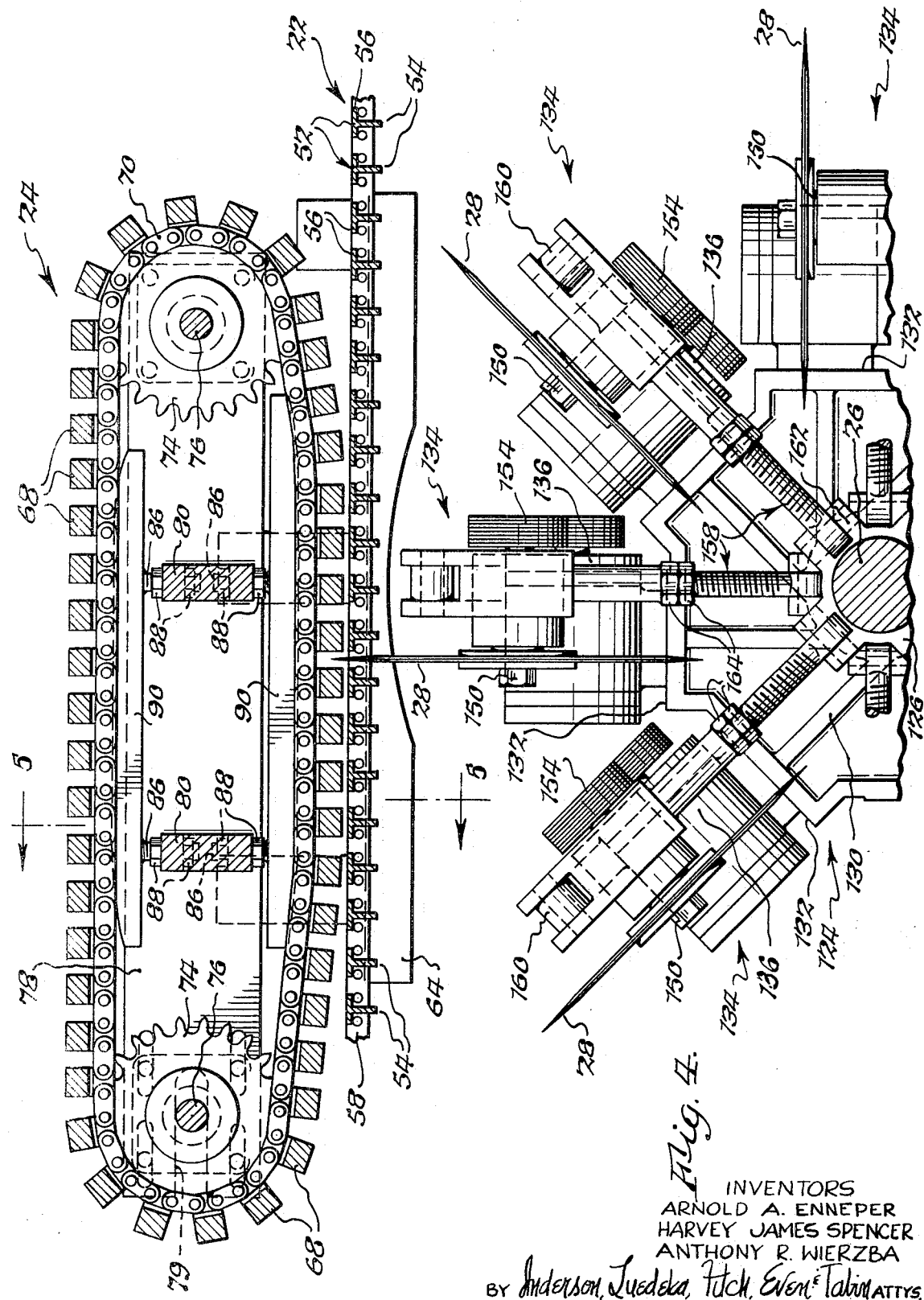
FIG. 4 is an enlarged fragmentary elevational view partially in section, taken generally along line 4—4 of FIG. 2.

The supporting conveyor 22 of the cutting apparatus, which can best be seen in FIGS. 1 through 5, supports the web as it passes through the apparatus, but permits access to the web from beneath by the cutting blades 28 as the web is moved. Basically, the conveyor 22 comprises a plurality of spaced bars 52 of T-shaped transverse cross sectional configuration having legs 54 and cross arms 56 (FIG. 4). The bars are arranged in parallel relation to one another with opposite ends of each bar connected to one of a pair of endless roller chains 58 by brackets 60 (FIG. 5).

The chains 58 are supported in horizontally spaced relation to each other on sprockets 62 (FIGS. 1 and 14) rotatably mounted on the frame 20. The chains define a somewhat rectangular path which includes an upper run portion extending horizontally across the upper end of the frame, portions which extend vertically along each end of the frame and a portion which extends horizontally across the bottom of the frame (FIG. 1). The upper run of the conveyor is further supported by horizontally disposed rails 64 (FIG. 5) which extend beneath the chains 58. The chains are so arranged that the cross arms 56 of the T-bars are uppermost and horizontal when passing along the upper run so as to thereby provide a generally flat supporting surface for the web.

In a preferred embodiment, the cross arms 56 of the bars are 1¼ inches in width and the bars are spaced with two inches between centers, thereby allowing the cutting blades to move between the bars and sever the web as the web and bars move (FIG. 4). The segments cut must, of course, be of a length which is a multiple of the distance between the T-bars. In that application of the invention in which it is employed to sever an enclosed pad to provide individual diapers, segments of 14 inches, 16 inches and 18 inches are cut, each being a multiple of the spacing of 2 inches provided.

The web holddown conveyor 24 is supported above the upper run of the supporting conveyor 22 and is formed of a plurality of bars 68 of rectangular cross sectional configuration (FIG. 4) interconnected in parallel, spaced relation by a pair of parallel endless roller chains 70, each bar being connected at each of its opposite ends to one of the chains by a bracket 72 (FIG. 5). The bars 68 are connected so as to travel on the outside of the loops formed by the chains, and are spaced from each other a distance equal to the spacing between the T-bars 52 of the supporting conveyor 22. The bars 68 are preferably as wide as the cross arms 56 of the T-bars 52, i.e., 1¼ inches, but are of a lesser length (FIG. 2).

The chains 70 are carried by sprockets 74 mounted on horizontally spaced shafts 76 arranged to provide the conveyor with an upper run and a lower run. As can be seen in FIG. 4 the lower run of the holddown conveyor is spaced very closely to the upper run of the supporting conveyor 22, this distance being no greater and preferably somewhat less, than the thickness of the material being conveyed so as to place the web in compression. As will be noted from FIG. 4 a shallow angle of entry is provided between the upper surface of the supporting conveyor 22 and the lower surface of the holddown conveyor 24. This permits the holddown conveyor to gradually come into contact with the web being conveyed (e.g., an enclosed diaper pad) to thus avoid bunching of the web.

The shafts 76 which support the holddown conveyor are rotatably mounted at their opposite ends in bearings carried by a pair of horizontally spaced plates 78 which extend parallel to the direction of web travel and which are suitably secured to the cross beams 42 and 45 of the frame. One of the shafts (the left hand shaft in FIG. 4) is mounted within a horizontally disposed slot 79 to permit adjustment in the tension of the chains 70 and to facilitate replacement thereof. A pair of horizontally spaced braces 80 extends between the plates 78 (FIGS. 4 and 5) and each is cut away adjacent each of its ends to provide an opening 82 defined above and below by webs 84. Each web is provided with a threaded hole which receives a bolt 86 having a lock nut 88 both above and below the web. Secured to the outer end of each bolt of each of the braces 80 is a rail 90 which engages the inner surface of one of the chains 70 of the holddown conveyor. The lowermost rails permit pressure to be applied by the conveyor 24 while the upper rails support the upper run of the conveyor between the sprockets 74. The bolts 86 permit adjustment of the position of the rails.

The shaft 26 about which the rotating cutting blades revolve is rotatably mounted on a pair of generally parallel heavy arms 92 which are keyed to a shaft 94 rotatably mounted on the frame. Thus, pivotal movement of the arms 92 effects raising and lowering of the shaft 26. The outer end of each of the arms 92 is provided with a flat upper surface which, during the operation of the apparatus, is generally horizontally disposed (see FIGS. 10 and 11), and each flat surface supports a pillow block bearing 96 which provides support for the shaft 26 adjacent one of the ends thereof.

Raising or lowering of the arms 92 and, hence, raising or lowering of the shaft 26, is accomplished by means of a jack 98 (FIGS. 3 and 14) comprising a housing 100 having an upwardly projecting lifting shaft 102 pivotally connected to one of the arms 92 beneath the bearing 96 supported thereon. A power input shaft 104 extends laterally into the housing 100 and is suitably connected to gearing within the housing so as to effect longitudinal vertical movement of the lifting shaft 102 when rotated. The input shaft 104 carries a gear 106 which meshes with a gear 108 of a gear box 110 positioned beneath the jack and upon which the jack is supported. The gear box, in turn, has an input shaft 112 upon which is mounted a sprocket 114 connected by means of a chain 116 to a sprocket 118 carried on a shaft 120 rotatably mounted on the support posts 34 and 36 of the frame 20. The shaft 120 is provided at one end with a crank 122 (FIG. 2) to facilitate its manual rotation effective to raise and lower the shaft 26

To provide support for the cutting blades 28 and other driving mechanisms on the shaft 26, a hub 124 is provided (FIGS. 1, 3 and 4) which is carried by the shaft and secured thereto for rotation therewith. The hub comprises a sleeve 126 and a supporting ring 128. The sleeve encircles the shaft 26. The supporting ring encircles the sleeve and is maintained in generally coaxial and spaced relation thereto by webs 130. The supporting ring 128 is of generally octagonal configuration (FIGS. 1 and 4) so as to provide eight plateaus 132, upon each of which a drive unit 134 of the cutting blades 28 can be supported.

Each drive unit 134 (FIG. 6) comprises a gear reduction 136 mounted on one of the plateaus 132. Each gear reduction includes an input shaft 138 connected through suitable beveled gears 139 (FIG. 6) to an output shaft 140. The input shaft 138 has mounted thereon a pinion gear 142 which meshes with a large spur gear 143 rotatably mounted on the shaft 26 (FIG. 3). The spur gear 143 and the pinion gears 142 are enclosed within a suitable housing or shield 144. Connected to the spur gear 143 and coaxial therewith is a gear 145 (FIGS. 2 and 3) coupled by means of a timing belt 146 to a motor 147 (FIGS. 2 and 14).

Thus, it will be seen that the pinion gears 142 coupled to the cutting blades 28 orbit around the shaft 26 and spur gear 143, while the spur gear is itself rotated about the shaft 26 independently of the rotation of the shaft 26. The speed of rotation of the cutting blades 28 is therefore not dependent upon the speed of rotation of the shaft 26.

Mounted on the housing of each gear reduction 136 for pivotal movement about the axis of the output shaft 140 is an arm 148 provided adjacent its outer end with a rotatably mounted shaft 150 disposed with its axis in parallel relation to the axis of the output shaft 140. The shaft 150 carries one of the cutting blades 28 disposed on one side of the arm 148 in spaced relation thereto. The output shaft has mounted on it a pulley 152 which is connected by a belt 154 to a pulley 156 mounted on the arm shaft 150 on the side opposite the cutting blade 28. Thus, rotation of the output shaft 140 is transmitted to the cutting blade 28.

As can be seen best in FIG. 1, the arm 148 of each cutting blade 28 is located so as to move within a plane containing the axis of the shaft 26 when pivoted about its mounting on the housing of the gear reduction 136. The cutting blades 28, however, lie in planes parallel to but offset from planes containing the axis of rotation of the shaft 26. The direction of offset is opposite to the direction of rotation so that the blades lag the arms 148. By virtue of this arrangement, each cutting blade reaches a vertical position before the upper edge of the blade has reached its ultimate height and lies in a more nearly vertical plane as it engages the web. Accordingly, the cut is more nearly square or straight-line than it would otherwise be, i.e., is less curved, and is also less beveled, i.e., more nearly vertical. During the cutting of the web, the portion of the cutting blade which is within the web and cutting the web has a horizontal velocity component essentially equal to the speed of the web.

It should be appreciated that the length of the segments being cut is directly related to the straight line or chordal distance between points on adjacent blades farthest from the axis of the shaft 26, these points being located on the path of maximum diameter traced by the blades. In order to change the length of the segments being cut as, for example, when it is desired to convert from the production of 14 inch diapers to the production of 16 inch diapers, this chordal distance is changed by changing the maximum diameter of the path traced by the blades. This, in turn, is accomplished by changing the distance between the axes of the shafts 150, about which the blades rotate, and the axis of the shaft 26, about which the blades orbit. In other words, the change is accomplished by moving the blades outwardly or inwardly relative to the shaft. It has been found that the preferred maximum path diameter for a segment length of 14 inches is approximately 37½ inches; for a segment length of 16 inches approximately 42½ inches; and for a segment length of 18 inches approximately 47½ inches.

The pivotal mounting of the arm 148 on the housing of the gear reduction 136 permits relative movement between the axis of the shaft 150 of the cutting blade 28 and the axis of the main shaft 26 and thereby permits such adjustment. The position of each blade is controlled by a brace or strut 158 which is pivotally mounted at one of its ends to an ear 160 projecting from the outer end of the arm 148 and which is pivotally connected at its opposite end to a collar 162 secured to the shaft 26 (FIG. 12). The strut 158 is threaded and provided with lock nuts 164 so that its length can be selectively varied.

Variation in the length of the strut 158 is also employed to compensate for a decrease in the diameter of the blades resulting from wear caused by a periodical sharpening of the blades. Thus, the strut is lengthened periodically to relocate points on the periphery of the blade on a path having the preferred diameter.

To maintain a relationship between the path traced by the cutting blades and the path of the web which will insure that the circular cutting blades will penetrate the web a sufficient degree to achieve complete severance of the web, the shaft 26 is raised or lowered as necessary when the length of the struts is altered to provide segments of different length. The elevation of the shaft 26 is not changed when the axes of rotation of the blades is changed to compensate for wear resulting from a sharpening of the blades since, in such instance, the diameter of the path traced by the blades does not change.

As was perviously mentioned in connection with the description of the conveyors 22 and 24, the cuts provided in the material or web being conveyed must be made between the bars 52 and 68 of the conveyors 22 and 24. Accordingly, the diameter of the path traced by the blades must be controlled very carefully not only to achieve the most efficient operation, but to avoid engagement between the blades and the bars of the conveyors. To facilitate such control, a gauge 166 is provided (FIGS. 12 and 13) and comprises a flat transparent plate 168 formed of a plastic or the like and provided with a pair of spaced parallel guide lines 170 which extend inwardly from one edge of the plate, hereinafter referred to as the outer edge. These lines are preferably spaced from one another a distance slightly greater than the width of the web. The plate 168 is mounted for pivotal movement about an axis adjacent its opposite or inner edge by means of hollow knuckles 172 which project from the plate and receive a rod 174 supported by a pair of brackets 176, one of which is mounted on each of the arms 92 upon which the shaft 26 is supported. As can be seen in FIG. 12, the plate 168 is held in generally horizontal disposition with its leading edge located in a position which corresponds to the position of the web relative to the blades when the blades are vertical. The length of the strut 158 is then adjusted until the outer edge of the blade and the guide lines 170 intersect the leading edge of the plate at the same points, thereby insuring that the blade will completely sever the web during the cutting.

In a preferred embodiment of the invention, wherein the material being cut is an enclosed pad severed to form diapers of three different lengths, three different path diameters are desired. In order to render the gauge effective for all three blade paths, the brackets 176 are each provided with three notches 178 for receiving the rod 174, each notch corresponding to one of the three paths. It will be noted that the notches are provided in an inclined edge of the brackets. The notches are at different elevations from each other, to compensate for changes in the length of the struts 158 and for the fact that the cutting blades do not lie in planes which contain the axis of the shaft 26.

The gauge 166 is also employed to relocate the blades each time they are sharpened.

It will also be appreciated that, for any given length of segment being cut, precise positioning of the shaft 26 is also desirable to properly locate the path of the blades relative to the path of the web being conveyed. Accordingly, a second gauge 180 is provided (FIGS. 10 and 11) and comprises a vertically disposed flat plate 182 mounted for pivotal movement about a pin 183 on a bracket 184 secured to the vertical support post 40 of the frame 20 so as to be aligned with one of the arms 92 which carries the shaft 26. The plate 182 is shaped to provide three shoulders 186, each of which is disposed so as to assume a generally downwardly facing position when properly oriented with respect to the bracket 184 so as to be engageable with the outer end of that arm 92 with which it is aligned. The plate 182 is provided with three holes 188, each of which is adapted to align with a hole in the bracket 184, thereby enabling the bracket and the plate to be fixed in position relative to each other in any one of three positions by a bolt 190 passed through the aligned holes. Each position corresponds to one of the desired elevational levels of the shaft 26. The shaft can therefore be accurately positioned by first locking the gauge plate 182 in the desired position and then raising the arms 92 by means of the jack 98 until the end of the one arm engages the appropriate shoulder 186.

In the operation of the overall system, of which the cutting aparatus forms only a part, it is desirable to maintain a constant and uniform speed of material or web movement regardless of the length of the segment into which the material is cut. However, the speed of rotation of the shaft 26 is varied relative to the speed of travel of the material, depending upon the length of the cut so that the horizontal component of the tangential velocity of that portion of each blade which is within the web will approximate the velocity of the web. Thus, the speed of rotation of the shaft will be greater for the cutting of segments 14 inches in length than for the cutting of segments 18 inches in length, assuming a constant speed of travel of the web or other material. The drive system for the apparatus is therefore capable of varying the speed of rotation of the shaft 26 while maintaining the speed of the conveyors 22 and 24 constant.

The drive system can be seen best in FIGS. 2 and 14 and comprises a line shaft 192 which preferably supplies power to other components of the system as well. The shaft 192 is coupled to a gear box 194 having an output shaft 196 which carries a pinion gear 198. The gear 198 meshes with a larger gear 200 rotatably mounted on the cross beam 45 of the frame by means of a shaft 202 which carries one of the sprockets 62 of the supporting conveyor 22. The shaft 202 carries a second sprocket 203 connected by means of a chain 204 to a sprocket 206 mounted on a shaft 208 which carries a gear 209 which meshes with a gear 210 mounted on one of the shafts 76 which carry the sprockets 74 of the holddown conveyor 24. Thus, the supporting conveyor 22 and the holddown conveyor 24 are drivingly interconnected for movement in unison.

The shaft 202 also carries a smaller gear 211, only a fragment of which is shown which meshes with a larger gear 212 mounted on a shaft 214, and the gear 212 in turn meshes with a larger gear 216 mounted on a shaft extension 218 of the shaft 94. The gear 216 in turn meshes with an intermediate gear 220 mounted on a shaft 22. The gear 222 meshes with a gear 224 connected to the shaft 26. Thus, the supporting conveyor 22, the holddown conveyor, and the shaft 26 are all driven by the line shaft 192 in timed relationship. The rotative position of the shaft 26 and the positions of the gaps or slots between conveyor bars are, of course, synchronized so that the blades will enter the gaps rather than engage the bars.

Variation in the speed of rotation of the shaft 26 is accomplished by substitution of gears of different diameter for the gear 224 carried by the shaft 26. Thus, a relatively small gear 224a (FIG. 11) is employed when small segments 14 inches in length are being cut; a medium size gear 224b (FIG. 10) is employed when segments 16 inches in length are being cut; and a large gear 224c (FIG. 14) is employed when segments 18 inches in length are being cut.

The variation in diameter of the gear 224 is accompanied by an adjustment in the position of the intermediate gear 220 to insure a driving relationship between the gears 216 and 224. Accordingly, the shaft 222 of the gear 220 is carried adjacent the outer end of an arm 226 which is mounted for pivotal movement about the shaft 218 of the gear 216, the gear 220 being thereby capable of being moved closer to or farther from the shaft 26 depending upon the diameter of the gear 224 while being maintained at a uniform distance from the shaft 218 and in continuous meshing engagement with the gear 216. The arm 226 is fixed in any one of three desired positions by means of a pair of brackets 228, one of which projects above an arm 92 supporting the shaft 26 and the other of which projects below the arm. Each bracket 228 is provided with three spaced holes 230, each of which aligns with one of a pair of holes in the arm 226 when the arm 226 is in one of three desired positions, corresponding to one of the three gear sizes employed. Bolts 232 are placed in the aligned holes to secure the arm and, hence, the gear in the desired position.

Provision is also made for sharpening the cutting blades 28 and comprises a honing device 234 (FIGS. 1, 7 and 8) supported on a platform 236 hingedly mounted on the support post 40 by means of a hinge pin 238. Mounted on the platform 236 are a pair of rails 239 which slidably support a plate 240 carrying a motor 242 as well as other operating portions of the honing device, as will hereinafter become apparent. A lug (not shown) projects downwardly from the bottom of the plate 240 and is provided with a threaded hole which receives a bolt 244 provided at one end with a crank 246 and journalled at its opposite end in a cross piece 248 which extends between and is perpendicular to the rails 239. When the crank 246 is rotated, the honing device is moved toward the blade for honing or back to an out-of-the-way position during indexing of the shaft 26 from one blade to the next and during the operation of the cutting apparatus.

Also mounted on the plate 240 in addition to the motor 242 are a pair of grinding wheels 249, each wheel being in the form of a truncated cone and being mounted for rotation about a generally horizontally disposed shaft 250 supported in standard 251 secured to the plate. The shafts 250 of the two grinding wheels 249 are disposed at different elevations (FIG. 7) so that, in the illustrated embodiment, the lower edge of one wheel is approximately level with the upper edge of the other. The shafts do not lie in a common plane but rather lie in planes which form an angle of approximately 15° with each other (FIG. 8).

Each shaft carries a pulley 252 which is connected to the grinding wheel and rotatably and slidably mounted on the shaft 250. Each pulley is coupled by means of a belt 254 to a double pulley 256 connected to the motor shaft 258. Idler pulleys 260 are provided intermediate the pulleys 252 and 256 to provide tension in the belts 254 if necessary.

In the operation of the honing device 234, it is desirable to bring the grinding wheels into contact with the cutting blades 28 for only a short predetermined period of time. Accordingly, a pneumatic timing system is provided and comprises (FIG. 9) a passageway 262 which extends from one end of each grinding wheel shaft 250 to the other and is coaxial therewith. The end of each shaft opposite the grinding wheel is provided with a fitting 264 to facilitate attachment thereto of a flexible conduit 266 connected to a suitable source (not shown) of air under pressure through a control valve (not shown) operated by a timing device (not shown). Each pulley 252, to one end of which one of the grinding wheels is attached, includes a hollow inner sleeve 268 (FIG. 9) spaced from the outer wall of the pulley by bearing rings 270. The sleeve 268 is slidable on the shaft 250 and moves outwardly thereon in response to a flow of air through the passageway 262 of the shaft, thus moving the grinding wheel outwardly toward the opposite grinding wheel 249. A plate 272 is also secured to the sleeve and is connected by a spring 274 to a pin 276 projecting laterally from the shaft adjacent the fitting 264, thereby biasing the pulley and grinding wheel inwardly along the shaft. The plate 272 also is provided with a notch which receives a rod 280 projecting from the bearing 251 in parallel relation to the shaft 250. The rod 280 serves to guide the sleeve 268 in its movement along the shaft.

From the foregoing, the operation of the apparatus can now be readily understood. The material to be separated into segments is delivered to the apparatus by an infeed conveyor 46 and passes between the lower supporting conveyor and the upper holddown conveyors 22 and 24, respectively, of the apparatus. The bars 52 and 68 of the conveyors engage and firmly hold the enclosed web at spaced positions therealong leaving gaps between the bars through which the cutting blades 28 have access to the web.

As the web is moved through the apparatus by the conveyors 22 and 24, it is periodically engaged by the cutting blades which orbit about a common shaft 26 and rotate about individual shafts 150. Engagement of the web by the cutting blade severs the web along generally straight lines transverse to the longitudinal axis of the web.

The length of segments into which the web is cut can be varied by altering the distance between the shaft 26 and the point on each cutting blade furthest from the axis of the shaft, and by varying the distance between the axis of the shaft 26 and the web. The distance between the shaft 26 and the outer edge of each cutting blade is varied by altering the length of the strut 158, and the distance between the shaft 26 and the web is altered by means of the jack 98. Gauges 166 and 180 are provided to insure accurate adjustment in each instance.

A honing device 234 is provided for sharpening the blades 28, such sharpening being accomplished by lowering the shaft 26 to a position below its lowest cutting position, properly locating a given cutting blade relative to the honing device, moving the honing device into operative relationship to the cutting blade and by means of the crank 246, and actuating the pneumatic timing device to bring the grinding wheel into contact with the cutting blade for a predetermined period of time. If desired, gauges can be provided to properly locate the shaft 26 and each blade 28 for the honing operation.

While the present invention has been described with respect to one preferred embodiment thereof, it should be apparent that various modifications may be made in this embodiment without departing from the scope of the invention.

Various of the features of the invention are set forth in the following claims.

What is claimed is:

1. An apparatus for cutting a continuously moving strip of flexible material into segments of predetermined length, said apparatus comprising a supporting conveyor for engaging one side of the strip and for moving the strip along a predetermined path, said conveyor including a plurality of continuously advancing supporting elements having their adjacent edges spaced from one another to define continuously advancing gaps therebetween providing access to the strip at a plurality of locations by a cutting instrument, a second conveyor positioned for engaging the other side of said strip and holding the same against movement from said supporting conveyor at time of cutting, said second conveyor including a plurality of continuously moving supporting elements each of which is positioned so as to be aligned with a supporting element of said supporting conveyor when in proximity thereto, a plurality of generally planar circular cutting blades mounted in circumferentially spaced relation about a first axis positioned adjacent the path of the strip, a support shaft for said blades at said first axis, a hub carried by said shaft, a plurality of support arms for carrying said cutting blades mounted to said hub and extending angularly therefrom to position said blades, a plurality of struts connected to said arms at points spaced from the ends thereof to hold said arms in angular positions relative to said axis, means for rotating said hub and effecting continuous orbital movement of said blades about said first axis into and out of penetrating engagement with the strip at said gaps, and means for effecting rotation of each of said cutting blades about a second axis transverse to the plane of the blade.

2. An apparatus in accordance with claim 1, wherein said supporting and said second conveyors are arranged to move along inclined paths so as to gradually converge toward each other adjacent that side of each first engaged by the strip to be cut, thereby providing a nip into which the strip enters.

3. An apparatus in accordance with claim 1, wherein said supporting elements are carried by an endless chain so as to be uniformly spaced from one another a predetermined distance.

4. An apparatus for cutting a continuously moving strip into segments of predetermined length, said apparatus comprising means including a plurality of continuously advancing supporting elements having adjacent edges spaced from one another to define continuously advancing gaps therebetween providing access to the strip at a plurality of locations by a cutting instrument, a plurality of circumferentially spaced generally planar circular cutting blades for severing said strip into segments mounted for orbital movement about a first axis for penetrating said gaps and moving into and out of severing contact with the strip, means for effecting rotation of each of said cutting blades about a second axis transverse to the plane of said blade, means for effecting relative movement between said first axis and the path of said strip so as to alter the distance therebetween, and means for locating said first axis in any one of several predetermined positions relative to the path of the strip at which each of said blades is positioned for penetrating a gap and severing said strip during an orbital movement thereof so that segments of various lengths may be cut from said strip.

5. An apparatus in accordance with claim 4, wherein means are provided for selectively varying the diameter of the path traced by each of the cutting blades orbiting around said first axis.

6. A cutting apparatus for cutting a pad of flexible material comprising a plurality of circumferentially spaced generally planar circular cutting blades mounted for orbital movement about a first axis, means including a support shaft and a support arm for each of said blades mounted on said shaft for rotation about said first axis, said support arms being pivotally mounted and movable to locate said blades at various positions relative to said first axis, means for effecting rotation of each of said cutting blades about a second axis transverse to the plane of the blade, and means for selectively varying the diameter of the path traced by each of said blades by varying the position of the support arms and the blades carried thereon relative to said first axis.

7. A cutting apparatus in accordance with claim 6, wherein means are provided for locating a predetermined portion of each of said blades in any one of several predetermined positions relative to said first axis.

8. A cutting apparatus in accordance with claim 6, wherein means are provided for selectively effecting a constant velocity of each of said blades for each of several predetermined positions of said edge relative to said first axis.

9. A cutting apparatus comprising a plurality of circumferentially spaced generally planar circular cutting blades mounted for orbital movement about a first axis, means for effecting rotation of each of said cutting blades about a second axis transverse to the plane of the blade, and means for sharpening each of said blades comprising a grinding member and means including a timing device for effecting contact between said grinding member and blade for a predetermined period of time.

10. A cutting apparatus in accordance with claim 9, wherein said sharpening means is stationary relative to said first axis, and wherein means are provided for moving said blades into predetermined relative to said sharpening means.

11. A cutting apparatus comprising a plurality of circumferentially spaced generally planar circular cutting blades mounted for orbital movement about a first axis, means for effecting rotation of each said cutting blades about a second axis transverse to the plane of the blade, means for selectively varying the diameter of the path traced by each of said blades by varying the position of the blades relative to said first axis, said means for selectively varying the diameter of the path traced by said blades comprising an elongated arm for each of said blades, each of said arms being mounted for pivotal movement within a plane parallel to the plane of said blade, and means for selectively limiting pivotal movement of said arms so as to fix each blade in position relative to said first axis.

(References on following page)

References Cited

UNITED STATES PATENTS

| | | | |
|---|---|---|---|
| 1,463,314 | 7/1923 | Ford | 83—22 |
| 1,690,209 | 11/1928 | Smith | 83—329 |
| 2,547,157 | 4/1951 | Gibbons | 83—329 X |
| 2,692,645 | 10/1954 | Driesch | 83—490 X |
| 2,752,999 | 7/1956 | Gage | 83—276 |
| 2,822,844 | 2/1958 | Busch | 83—174 X |
| 3,160,339 | 12/1964 | Love | 83—329 X |
| 3,218,898 | 11/1965 | Briscoe | 83—174 |
| 3,292,470 | 12/1966 | Nystrand et al. | 83—174 |
| 3,316,820 | 5/1967 | Groner et al. | 83—329 X |

FOREIGN PATENTS

| | | |
|---|---|---|
| 917,449 | 2/1963 | Great Britain. |

FRANK T. YOST, Primary Examiner

U.S. Cl. X.R.

83—325, 329

UNITED STATES PATENT OFFICE
CERTIFICATE OF CORRECTION

Patent No. 3,512,437          Dated May 19, 1970

Inventor(s) Arnold A. Enneper, et al

It is certified that error appears in the above-identified patent and that said Letters Patent are hereby corrected as shown below:

Column 4, line 20, after "FIGS." should appear --1,--;
         line 34, "posiitoned" should read --positioned--;
         line 42, after "26" should appear a period.
Column 6, line 3, "perviously" should read --previously--.
Column 7, line 35, "22" should read --222--;

Column 10, line 58, after "predetermined" should appear --positions--.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents

Dedication 3,512,437.—*Arnold A. Enneper, Harvey James Spencer* and *Anthony R. Wierzba*, Green Bay, Wis. ORBITING ROTARY CUTTING APPARATUS. Patent dated May 19, 1970. Dedication filed Dec. 17, 1974, by the assignee, *International Paper Company*.

Hereby dedicates to the Public the entire remaining term of said patent.

[*Official Gazette April 22, 1975.*]